United States Patent Office 3,692,666
Patented Sept. 19, 1972

3,692,666
LOW PRESSURE, LOW SEVERITY
HYDROCRACKING PROCESS
Ernest L. Pollitzer, Skokie, Ill., assignor to Universal Oil Products Company, Des Plaines, Ill.
No Drawing. Continuation-in-part of application Ser. No. 823,521, May 9, 1969. This application Sept. 21, 1970, Ser. No. 74,236
Int. Cl. C10g 13/02, 23/02, 37/00
U.S. Cl. 208—112
3 Claims

ABSTRACT OF THE DISCLOSURE

A catalytic process for converting a hydrocarbonaceous charge stock at a low operating severity including a maximum catalyst bed temperature of 350° F. to about 650° F. and a pressure of 200 to about 500 p.s.i.g. The catalyst is a composite of a Group VIII noble metal component, or a nickel component, and the reaction product of alumina and a sublimed Friedel-Crafts metal halide. A preferred technique involves introducing a low molecular weight olefin into the conversion reaction zone.

RELATED APPLICATION

The present application is a continuation-in-part of my copending application, Ser. No. 823,521, filed May 9, 1969 now abandoned.

APPLICABILITY OF INVENTION

The present invention is directed toward the conversion of hydrocarbon charge stocks into lower-boiling hydrocarbon products. My invention also encompasses a low-pressure, low severity catalytic hydrocracking process. The catalyst utilized in the process of the present invention can, in general, be categorized as a dual-function catalyst having both hydrogenation and cracking activity.

Catalytic composites having a dual function enjoy widespread use in many industries for the purpose of accelerating a wide spectrum of hydrocarbon conversion reactions. Generally, the cracking function is thought to be associated with an acid-acting material of the porous, adsorptive, refractory oxide type which is utilized as the carrier material for one or more metallic components from the metals of Groups V through VIII of the Periodic Table. These catalytic composites are employed to promote a wide variety of hydrocarbon conversion reactions including hydrocracking, hydrogenation, desulfurization, alkylation and transalkylation, cracking, ring-opening (a form of cracking), hydroisomerization, etc. In many cases, the commercial application resides in a process where more than one of these reactions proceed simultaneously. For example, in a hydrocracking process, to which the present invention is specifically directed, catalysts of this type are utilized to effect the hydrogenative cracking of high molecular weight material to produce a lower-boiling, normally liquid effluent; the principal reactions being cracking, hydrogenation and isomerization. The catalyst, for use in the present process, as hereinafter described in greater detail, is a composite of a Group VIII noble metal component, or a nickel component, and the reaction product of alumina and a sublimed Friedel-Crafts metal halide.

Suitable charge stocks include naphtha, or gasoline boiling range fractions, where the desired end result is the production of maximum quantities of a pentane/hexane fraction. Heavier charge stocks include kerosenes, boiling in the range of about 300° F. to about 600° F.; light gas oils, boiling in the range of 500° F. to about 750° F.; and, heavy gas oils boiling up to about 950° F. With some modifications, the fresh feed charge stock to the present process may even contain heavier hydrocarbons boiling up to a temperature of about 1,050° F. In view of the current interest generated with respect to "clear," or "lead-free" gasolines, due principally to considerations involving violence to the atmosphere, the present invention finds exceptional utility since (1) very little methane/ethane is produced, (2) some propane concentrate, for subsequent alkylation or isopropyl alcohol production, is obtained, (3) the resulting pentane/hexane concentrate is highly branched and suitable for direct use in the "clear" gasoline pool and, (4) the heptane and heavier naphtha product is rich (at least about 80.0% by volume) in naphthenes which, upon being subject to catalytic reforming results in an aromatic concentrate having a research octane rating, clear, of 102 to 105, or more. The extent to which hydrocracking is effected is dependent upon the ultimately desired product—i.e. whether motor fuel gasoline, kerosene, middle-distillates, etc., or a product slate comprising various combinations thereof.

Most of the virgin stocks, intended for hydrocracking, are contaminated by sulfurous compounds and nitrogenous compounds, and, in the case of the heavier charge stocks, metallic contaminants and insoluble asphalts, etc. Such contaminated charge stocks are generally subjected to hydrotreating, or hydrorefining, in order to prepare a feed stock suitable for hydrocracking. These hydrorefining processes and techniques are thoroughly described in the literature, and further discussion is not required herein. Since no specific hydrotreating process forms an essential feature of my invention, it will be presumed that the charge stocks discussed have been previously subjected to a clean-up operation. Thus, the process encompassed by the present invention can be beneficially utilized as the second stage of a two-stage process, in the first stage of which the fresh feed is hydrorefined. Heretofore, hydrocarbon feed stocks have been subjected to an operational severity level including maximum catalyst bed temperatures ranging from about 700° F. to about 950° F., and pressures from about 500 to about 5,000 p.s.i.g. Through the practice of the present invention, low severity hydrocracking can be effected at maximum catalyst bed temperatures in the range of about 350° F. to about 650° F. and pressures from about 200 to about 500 p.s.i.g. The many advantages attendant low severity operation, versus high severity operation, will be readily recognized by those skilled in the art of petroleum refining techniques. Although higher catalyst temperatures may be employed, and the process will benefit significantly through the use of the particular catalyst at the lower pressure, lower temperatures in the aforesaid range are possible, and represent a very distinct advantage.

OBJECTS AND EMBODIMENTS

An object of the present invention is to provide a hydrocracking process which can be effected at low severity conditions of operation. A corollary objective is to effect the hydrocracking of hydrocarbonaceous material at a maximum pressure of 500 p.s.i.g. and a maximum catalyst bed temperature of 650° F.

Another object is to provide a hydrocracking process wherein the production of butanes and other normally gaseous hydrocarbons is substantially reduced while experiencing an increase in normally liquid hydrocarbon yield.

Therefore, in a broad embodiment, my invention involves a process for hydrocracking a hydrocarbonaceous charge stock, to produce lower-boiling hydrocarbon products, which process comprises reacting said charge stock and hydrogen, at hydrocracking conditions including a pressure of 200 to about 500 p.s.i.g., and in contact with a catalytic composite of a Group VIII noble metal component, or a nickel component, and the reaction product of alumina and a sublimed Friedel-Crafts metal halide.

In another embodiment, the conversion conditions include a hydrogen circulation rate of about 3,000 to about 20,000 s.c.f./bbl., an LHSV of 1.0 to about 10.0, a maximum catalyst temperature of from 350° F. to about 650° F. and the addition of a low molecular weight olefin, in an amount of from 1.0% to about 20.0% by weight, to the fresh feed charge stock.

Other objects and embodiments of my invention relate to the specifics regarding preferred catalytic ingredients, the concentration of components within the catalyst, the preferred method of catalyst preparation, operating conditions for utilization in the hydrocracking process, and other similar particulars which are hereinafter given in the following detailed discussion.

PRIOR ART

As hereinbefore set forth, the present invention is directed toward the use of a catalytic composite containing a Group VIII noble metal component, or a nickel component, and the reaction product of alumina and a sublimed Friedel-Crafts metal halide. Thus, where the metal halide is, for example, aluminum chloride, the catalyst is characterized by the following group:

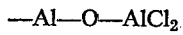

These are, within the composite, interconnected in somewhat the following manner:

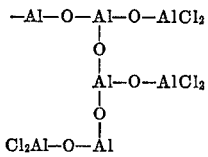

etc.

Candor compels recognition of the fact that Friedel-Crafts metal halides are known catalytic components. Thus, U.S. Pat. No. 2,924,628 (Cl. 260-666) describes an isomerization process—i.e. butane to isobutane—utilizing a catalyst of alumina having a Friedel-Crafts metal halide vaporized thereon. A brief perusal indicates, however, that there is no recognition that such a composite affords remarkable advantages in hydrocracking, when containing a Group VIII noble metal component, or a nickel component.

Similarly, U.S. Pat. 2,914,461 (Cl. 208-111) describes the use of a catalyst comprising metals of the platinum and palladium series deposited upon a synthetic composite of a refractory metal oxide and a metal halide for hydrocracking. Significantly, this particular patent is totally silent respecting sublimation of the metal halide in order to produce the reaction product thereof with alumina. In fact, the patent teaches ball milling, treating an alumina hydrogel with hydrogen fluoride, impregnation of alumina or silica with an aqueous solution of a water-soluble halide, etc., as means suitable for compositing a carrier and a metal halide. Further, the preferred means for incorporating the noble metal component involves impregnating the carrier, containing a metal halide, with an aqueous solution of a halogen-containing acid of the desired metal. None of the methods disclosed, for combining the carrier and the metal halide, will produce the reaction product containing the

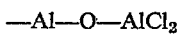

grouping. Further, it is highly improbable that the metal halide is sufficiently strong to break into a silica bond. Additionally, the —Al—O—AlCl₂ group is highly sensitive to water, and is effectively destroyed upon contact therewith. Thus, in accordance with the present invention, the catalytically active metallic component is first combined with alumina, the composite is dried and calcined, and then the Friedel-Crafts metal halide is sublimed therein.

While U.S. Pat. 3,354,078 (Cl. 208-120) teaches catalytic cracking (as distinguished from hydrocracking) with a crystalline aluminosilicate which has been activated by a volatile metal halide, only the barest mention is made of subliming the volatile metal halide. As hereinbefore stated, the volatile metal halide is insufficiently strong to effect reaction with the silica in the zeolitic material. That this reference does not even recognize that such a reaction product exists in any event, is evidenced by the fact that it is acknowledged that the volatile metal halide emerges from the reaction zone along with the cracked products, and is capable of easy separation therefrom.

In short, the foregoing described prior art does not recognize the essence of the present invention which is to cause the sublimed metal halide to react with the carrier material, alumina, to produce the acidic group

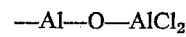

SUMMARY OF INVENTION

The operating conditions, under which the process is conducted, will vary according to the physical and chemical characteristics of the charge stock, as well as the desired end result. In the past, hydrocracking reactions have generally been effected at temperatures in the range of about 1,500 to about 5,000 p.s.i.g., liquid hourly space velocities of 0.25 to about 5.0, hydrogen circulation rates of about 5,000 to about 50,000 s.c.f./bbl. and maximum catalyst bed temperatures of from 700° F. to about 950° F. As indicated in the prior art, the heavier charge stocks, being those containing a considerable quantity of hydrocarbons boiling above a temperature of about 900° F., require a high severity of operation including high pressures, high catalyst bed temperatures, relatively low liquid hourly space velocities and high hydrogen circulation rates. Obviously, low severity operation is employed with comparatively lighter feed stocks. Through the practice of the present invention, regardless of the characteristics of the charge stock, the hydrocracking process can be effected at lower severity conditions than those currently in use.

In accordance with the present invention, utilizing a catalytic composite comprising a Group VIII noble metal component, or a nickel component, and the reaction product of alumina and a sublimed Friedel-Crafts metal halide, the conversion conditions include a pressure of 200 to about 500 p.s.i.g., a hydrogen circulation rate of 3,000 to about 20,000 s.c.f./bbl., an LHSV of about 1.0 to about 10.0 and a maximum catalyst temperature of from 350° F. to about 650° F. It will be immediately recognized by those possessing expertise in the art of petroleum refining techniques, that these conditions are significantly less severe than those heretofore believed necessary. It has been found, however, that the low severity, low pressure process of the present invention, utilizing the catalytic composite hereinbefore set forth, results in what is considered undesirable in many situations, the over-production of butanes, with a slight, but measurable increase in the quantity of normally gaseous hydrocarbons, methane, ethane and propane. Since the process of the present invention produces a butane concentrate of which from about 70.0% to about 80.0% by volume, or more is isobutane, it might be stated that the over-production of a butane concentrate has certain advantages; for example, in the dehydrogenation thereof to produce isobutylene, followed by alkylation. However, it is often the case that the desired product slate includes maximum quantities of normally liquid hydrocarbons, including pentanes and heavier material. Therefore, with an intended product slate in which maximum quantities of normally liquid hydrocarbons are desired, the present process provides for the addition of a low molecular weight olefin to the fresh hydrocarbon charge stock. The low molecular weight olefin is employed in an amount of from about 1.0% to about 20.0% by weight of the fresh hydrocarbon charge stock, and is selected from the group of ethylene, propylene, butylenes and pentenes. The presence of the low molecular weight olefin within the reaction zone induces a reduction in the formation of butanes by reaction thereof with the $C_4$- carbonium ions present on the surface of the catalyst. The product of this reaction is then hydrogenated as a result of the hydrogen atmosphere within the reaction zone, to produce a higher molecular weight paraffinic hydrocarbon, and one which normally boils in the gasoline boiling range.

With respect to the porous carrier material, it is preferred that it be adsorptive and possess a high surface area of about 25 to about 500 square meters per gram. Heretofore, suitable carrier materials have been selected from the group of amorphous refractory inorganic oxides, including alumina, titania, zirconia, chromia, magnesia, thoria, boria, silica-alumina, silica-magnesia, chromia-alumina, alumina-boria, alumina-silica-boron phosphate, silica-zirconia, etc. When of the amorphous type, the preferred carrier material appears to be a composite of alumina and silica, with silica being present in an amount of about 10.0% to about 90.0% by weight. Recent developments in the area of catalysts have shown that various crystalline aluminosilicates can be utilized to advantage in some cases. Such zeolitic material includes mordenite, faujasite, Type A or Type U molecular sieves, etc. Where utilized, the crystalline aluminosilicate has been in the hydrogen form, or in a form which results from treatment with multi-valent cations.

In view of the fact that the sublimed Friedel-Crafts metal halide is not strong enough to react with silica, to form the type of group hereinbefore described, the preferred carrier is alumina. While the action and effect of the sublimed metal halide on refractory material, other than alumina and silica, for example, zirconia, is not known with accuracy, it is not now believed that reaction takes place to a degree sufficient to produce the desired catalyst and result.

Suitable alumina carrier materials have an apparent bulk density of about 0.30 to about 0.70 gm./cc., and surface area characteristics indicating an average pore diameter of about 20 to about 300 Angstroms, a pore volume of about 0.10 to about 1.0 milliliters per gram and a surface area of about 100 to about 500 square meters per gram. The carrier material may be prepared in any suitable manner, none being essential to my invention, and may be activated prior to use by one or more treatments including drying, calcination, steaming, etc. For example, the amorphous carrier may be prepared by adding a suitable alkaline reagent, such as aluminum chloride, aluminum nitrate, etc., in an amount to form a hydroxide gel which, upon drying and calcination is converted into alumina. This may be formed in any desired shape including spheres, pills, cakes, extrudates, powders, granules, etc., and may further be utilized in any desired size.

As previously indicated, the catalyst for use in the process of the present invention contains a Group VIII noble metal component, or a nickel component. Thus, suitable metals are those of the group including platinum, palladium, rhodium, ruthenium, osmium, iridium and nickel. Iron and cobalt components do not appear to possess the propensity for effecting the desired degree of hydrocracking, and are, therefore, excluded from the group of suitable metallic components. A particularly preferred catalytic composite contains a platinum, palladium or nickel component. The Group VIII metal component, for example platinum, may exist within the final composite as a compound such as an oxide, sulfide, halide, etc., or in an elemental state. Generally the amount of the noble metal component is small compared to the quantities of the other components combined therewith. Calculated on an elemental basis, the noble metal component generally comprises from about 0.1% to about 2.0% by weight of the final composite. With respect to the nickel component, again calculated on the basis of the elemental metal, it will be present within the catalytic composite in an amount of from about 1.0% to about 10.0% by weight.

These components may be incorporated within the catalytic composite in any suitable manner including co-precipitation or co-gellation with the carrier material, ion-exchange, or impregnation. The latter constitutes a preferred method of preparation, utilizing water-soluble compounds of the metallic components. Thus, the platinum component may be added to the carrier material by commingling the latter with an aqueous solution of chloroplatinic acid. Other water-soluble compounds may be employed, and include ammonium chloroplatinate, platinum chloride, dinitro-diamino platinum, chloropalladic acid, palladic chloride, nickel nitrate hexahydrate, etc. It is generally preferred to impregnate the carrier material after it has been calcined in order to minimize the risk of losing the valuable noble metal compounds. Following impregnation, the carrier material is dried and subjected to a calcination, or oxidation technique, generally followed by reduction in hydrogen at an elevated temperature.

An essential ingredient of the catalytic composite is a Friedel-Crafts metal halide which, when sublimed, combines, by way of reaction, with the alumina. The preferred method of incorporating the Friedel-Crafts metal halide involves a sublimation, or vaporization technique, with the vaporized metal halide contacting alumina containing the Group VIII noble metal component, or the nickel component. That is, the catalytically active metal component is already composited with the alumina before the latter is contacted with the sublimed metal halide.

Briefly, therefore, the preferred technique involves the incorporation of the Friedel-Crafts metal halide after the catalytically active metal components have been impregnated onto the carrier material, and following drying and calcination, and reduction in hydrogen. Where the sublimation technique is utilized, with the alumina carrier material, the metal halide will be vaporized onto the carrier, and the same heated to a temperature above about 300° C., and for a time sufficient to remove any unreacted metal halide. Thus, the final catalytic composite does not contain any free Friedel-Crafts metal halides. The refractory oxide, following vaporization of the Friedel-Crafts metal halide, and heating of the thus-formed composite, will be increased in weight by from about 2.0% to about 25.0% based upon the original weight of the refractory oxide carrier material. While the exact increase in weight does not appear to be critical, high activity catalysts are obtained when the thus-treated refractory material has been increased in weight from about 5.0% to about 20.0%. On the basis of the quantity of the metal halide combined therewith, the treated carrier material will contain from about 1.96% to about 20.0% by weight of the metal halide, and preferably from about 4.76% to about 16.67% by weight, as the metal halide. Further details of this sublimation technique may be found in U.S. Pat. No. 2,924,628 (Cl. 260–666), issued to G. R. Donaldson. Since the group, —Al—O—$AlCl_2$, is extremely moisture sensitive, the sublimation technique is effected after the Group VIII noble metal component, or nickel component, has been combined with the alumina.

Various Friedel-Crafts metal halides may be utilized, but not necessarily with equivalent results. Examples of such metal halides include aluminum bromide, aluminum chloride, antimony pentachloride, beryllium chloride, ferric bromide, ferric chloride, gallium trichloride, stannic bromide, stannic chloride, titanium tetrabromide, titanium tetrachloride, zinc bromide, zinc chloride, and zirconium chloride. The Friedel-Crafts aluminum halides are preferred with aluminum chloride and/or aluminum fluoride being particularly preferred. This is so, not only due to the ease of preparation, but also because the thus-prepared catalyst have unexpectedly high activity.

The temperature at which the Friedel-Crafts metal halide is vaporized onto the alumina, will vary in accordance with the particular Friedel-Crafts metal halide utilized. In most instances, the vaporization is carried out either at the boiling point or sublimation point of the particular Friedel-Crafts metal halide, or at a temperature not greatly exceeding these points; for example, not greater than 100° C. higher than the boiling point, or sublimation point. In effecting one catalyst preparation, the amorphous carrier material has aluminum chloride sublimed thereupon. Aluminum chloride sublimes at 178° C., and thus a suitable vaporization temperature will range from about 180° C. to about 275° C. The sublimation can be carried out under pressure, and also in the presence of diluents such as inert gases.

Although the particularly preferred technique involves the sublimation of a metal halide directly to react with the alumina, the reaction product can result from a halide-containing compound which initially reacts with the alumina to form an aluminum halide which, in turn, reacts with additional alumina, thereby forming groups of —Al—O—AlCl$_2$. Such halide containing compounds include CCl$_4$, SCl$_2$, SOCl$_2$, etc.

Prior to its use, the catalytic composite may be subjected to a substantially water-free reduction technique. This is designed to insure a uniform and finely-divided dispersion of the metallic components throughout the carrier material. Preferably, substantially pure and dry hydrogen is employed as the reducing agent. The catalyst is contacted at a temperature of about 800° F. to about 1200° F., and for a period of time from 0.5 to about 10 hours, to substantially reduce the metallic components.

The hydrocracking process is often improved when the reduced composite is subjected to a presulfiding operation designed to incorporate from about 0.05% to about 0.50% by weight of sulfur, on an elemental basis. This presulfiding treatment takes place in the presence of hydrogen and a suitable sulfur-containing compound including hydrogen sulfide, lower molecular weight mercaptans, organic sulfides, etc. This technique involves treating the reduced catalyst with a sulfiding gas, such as a mixture of hydrogen and hydrogen sulfide having about 10 moles of hydrogen per mole of hydrogen sulfide, and at conditions sufficient to effect the desired incorporation of sulfur. These conditions include a temperature ranging from about 50° F. to about 1100° F. It is, of course, good practice to perform the presulfiding technique under substantially water-free conditions.

According to the present invention, the hydrocarbon feed stock, preferably water and oxygen-containing compound free, and hydrogen are contacted with a catalyst of the type hereinabove described, in a hydrocarbon conversion zone. The particular catalyst employed is primarily dependent upon the characteristics of the charge stock as well as the desired end result. The contacting may be accomplished by using the catalyst in a fixed-bed system, a moving-bed system, a fluidized-type bed system or in a batch type operation; however, in view of the risk of attrition loss of the valuable catalyst, it is preferred to use the fixed-bed system. On the other hand, with exceptionally heavy charge stocks containing non-distillable asphaltics, a preferred technique involves the use of a fluidized-bed system. In the fixed-bed type of system, a hydrogen-rich gas and the charge stock are preheated by any suitable heating means to the desired reaction temperature, and are then passed into the conversion zone containing the fixed-bed of the catalytic composite. It is understood, of course, that the conversion zone may be one or more separate reactors having suitable means therebetween to insure that the desired conversion temperature is maintained at the entrance to each reactor. The reactants may be contacted by the catalyst bed in either upward, downward, or radial flow fashion, with the latter being preferred. Additionally, the reactants may be in the liquid phase or a mixed liquid-vapor phase when contacting the catalyst.

In view of the fact that the reactions being effected are exothermic in nature, an increasing temperature gradient is experienced as the hydrogen and feed stock traverse the the catalyst bed. In accordance with the present process, the maximum catalyst bed temperature, virtually the same as that at the outlet of the reaction zone, is in the range of about 350° F. to about 650° F. In order to assure that the catalyst bed temperature does not exceed the maximum allowable, the use of conventional quench streams, either normally liquid, or normally gaseous, introduced at one or more intermediate loci of the catalyst bed, may be utilized. When hydrocracking a heavy hydrocarbonaceous material, to produce lower-boiling hydrocarbon products, that portion of the normally liquid product effluent boiling above the end boiling point of the desired product will be recycled to combine with the fresh hydrocarbon charge stock. In these situations, the combined liquid feed ratio (defined as volumes of total liquid charge to the reaction zone per volume of fresh feed charge to the reaction zone) will be within the range of about 1.1 to about 6.0.

In a few situations involving the higher-boiling feed stocks—i.e. 900° F. to 1050° F.—which generally contain metallic contaminants, as well as asphaltics, the catalytic composite tends to be poisoned by highly condensed-ring aromatics. The activity is apparently impaired by the presence of these aromatics in view of the fact that they are so strongly adsorbed before hydrogenative cracking can be effected. Since even a prior hydrorefining operation does not sufficiently hydrogenate these aromatics, especially with the higher-boiling feed stocks, the catalytic composite will ultimately lose its effectiveness. To counteract this adverse effect, a high-boiling organic chloride, such as nonyl chloride, decyl chloride, undecyl chloride, dodecyl chloride, alkyl chlorobenzene, alkyl benzyl chlorides, chlorinated alkyl cyclohexane, etc., is added to the heavy fresh feed in an amount of from 100 to 500 p.p.m. by weight, and based upon fresh feed exclusive of liquid recycle. In effect, this technique causes the liquid layer (condensed aromatics) on the catalyst to be dissolved, and thereby become more accessible, and open to the influence of the hydrogen and hydrogenative activity of the catalyst.

EXAMPLE

In presenting this example, it is not intended that my invention be limited to the specific illustration, nor is it intended that the hydrocracking process be limited to the specific operating conditions, processing techniques, catalytic composites and other individual process details. It is to be understood, therefore, that the present invention is merely illustrated by the specifics hereinafter set forth.

The specific illustration of the hydrocracking process encompassed by my invention involves the use of a catalytic composite of about 5.0% by weight of nickel, alumina and about 7.5% by weight of aluminum fluoride which has been sublimed onto the alumina-nickel composite. The catalyst is intended for utilization in the conversion of a No. 2 Fuel Oil with the intended object being the production of a maximum quantity of a heptane-350° F. naphtha boiling range fraction. The charge stock indicates a gravity of about 35.9° API, an initial boiling point of 335° F., a 50.0% volumetric distillation temperature of 555° F. and an end boiling point of about 800° F., and contains 0.57% by weight of sulfur (5,700 p.p.m.) and 130 p.p.m. of nitrogenous compounds, calculated as nitrogen. The charge stock, in an amount of 20,000 bbl./day, is initially subjected to a clean-up operation, at a maximum catalyst bed temperature of about 750° F., a combined feed ratio of 1.0, and an LHSV of about 2.54, with a hydrogen circulation rate of about 10,000 s.c.f./bbl. The pressure imposed upon the catalyst within the clean-up reaction zone is about 600 p.s.i.g. This particular unit is designed to function in a series-flow manner, with the total product effluent from the clean-up zone being utilized as the charge to the hydrocracking reaction zone. The hydrogen consumption in the first reaction zone is about 1.02% by weight (570 s.c.f./bbl.). Prior to entering the hydrocracking reaction zone, the product effluent from the clean-up reaction zone is admixed with about 6.0% by weight of propylene. On a volumetric basis, the normally liquid charge to the hydrocracking reaction zone constitutes about 2.04% butanes, 1.50% pentanes, 1.68% hexanes, 9.95% of a heptane-350° F. fraction and 86.72% of hydrocarbons boiling above a temperature of about 350° F., exclusive of recycle. The hydrocracking reaction zone is maintained at a pressure of about 475 p.s.i.g., and the combined liquid feed ratio is about 1.59, resulting from the recycle of about 11,800 bbl./day of that portion of the hydrocracked product effluent boiling above a temperature of 350° F. The total charge to the hydrocracking reaction zone is heated to a temperature such that the catalyst bed inlet temperature is about 550° F., and a conventional hydrogen quench stream is utilized in an amount of about 3,000 s.c.f./bbl., to maintain the maximum catalyst bed temperature at a level of about 600° F. The quantity of catalyst disposed within the hydrocracking reaction zone is such that the LHSV therethrough, based upon fresh feed, exclusive of the recycle diluent, is about 0.99. Following separation of the product effluent, to concentrate the desired naphtha boiling range fraction, the normally liquid material boiling above a temperature of 350° F. is recycled to the inlet of the hydrocracking reaction zone providing a previously stated combined liquid feed ratio of 1.59.

In the following table, there is indicated the product yield and distribution of this illustrative hydrocracking process. Included is the ammonia, hydrogen sulfide and light normally gaseous hydrocarbons, the yields of which are given in weight percent. The yields of butanes and heavier, normally liquid hydrocarbons are given in volume percent. With respect to the hydrocracking reaction zone, the hydrogen consumption is 1.40% by weight, or 781 s.c.f./bbl. Thus, with respect to the overall process, the total hydrogen consumption is 2.41% by weight, or 1,351 s.c.f./bbl.

TABLE.—PRODUCT YIELD AND DISTRIBUTION

| Component: | Yield |
|---|---|
| Ammonia | 0.02 |
| Hydrogen sulfide | 0.61 |
| Methane | 0.39 |
| Ethane | 0.56 |
| Propane | 3.82 |
| Butanes | 10.61 |
| Pentanes | 15.00 |
| Hexanes | 23.65 |
| Heptane-350° F. | 69.05 |

In the absence of propylene addition to the hydrocracking feed stock, the total butane production is 23.11% by volume, the total pentane/hexane yield is 34.60% and the heptane-350° F. naphtha yield is 61.05%. With respect to the as-produced pentane/hexane combined fraction, the gravity is 82.0° API, the research octane rating, clear, is 83.8 and the research octane rating, leaded, is 98.0; it will be recognized that this constitutes a very suitable motor fuel blending component. With respect to the as-produced naphtha fraction, the gravity is 56.6° API, and the fraction constitutes 54.9% by volume of paraffins, 30.6% by volume of naphthenes and 14.5% by volume of aromatics. The research octane rating, clear, is 62.5 and the research octane rating, leaded, is 81.3; this fraction is, therefore, a suitable charge to a catalytic reforming unit for the purpose of increasing the octane ratings thereof.

The foregoing specification, and particularly the example, indicates the method by which the present invention is effected and the benefits afforded through the utilization thereof.

I claim as my invention:

1. A process for hydrocracking a hydrocarbonaceous charge stock, to produce lower-boiling hydrocarbon products, which comprises reacting said charge stock and hydrogen at a temperature of 350°–650° F., a pressure of 200–500 p.s.i.g., a hydrogen circulation rate of 3000–20,000 s.c.f./bbl., and a liquid hourly space velocity of 1–10, and in contact with a Friedel-Crafts metal halide-free catalytic composite of from about 0.1% to about 2.0% of platinum and the reaction product of alumina and sublimed aluminum chloride, said catalyst having been prepared by reacting sublimed $AlCl_3$ with a preformed calcined composite of platinum and alumina and thereafter heating at a temperature above about 300° C. for a time sufficient to remove unreacted aluminum chloride.

2. The process of claim 1 further characterized in that said charge stock is commingled with a low molecular weight olefin, in an amount of from 1.0% to about 20.0% by weight, prior to contacting said catalytic composite.

3. The process of claim 1 further characterized in that said preformed composite is reduced with hydrogen prior to contact with said sublimed $AlCl_3$.

References Cited

UNITED STATES PATENTS

| 3,128,243 | 4/1964 | Yamamoto | 208—112 |
| 3,525,699 | 8/1970 | Koppel et al. | 252—433 |
| 2,914,461 | 11/1959 | Ciapetta | 208—111 |
| 3,227,658 | 1/1966 | Myers et al. | 252—433 |
| 3,214,366 | 10/1965 | Brennan et al. | 208—110 |
| 3,360,456 | 12/1967 | Kosiba et al. | 208—59 |
| 3,392,109 | 7/1968 | Beuther et al. | 208—112 |
| 3,410,790 | 11/1968 | Rausch | 208—139 |

FOREIGN PATENTS

| 1,007,327 | 10/1965 | Great Britain | 208—111 |

DELBERT E. GANTZ, Primary Examiner

G. E. SCHMITKONS, Assistant Examiner

U.S. Cl. X.R.

252—442